(12) United States Patent  
Werker et al.

(10) Patent No.: US 10,741,332 B2  
(45) Date of Patent: Aug. 11, 2020

(54) COOLING OF ELECTROLYTIC CAPACITORS IN ELECTRICAL CLIMATE COMPRESSORS

(71) Applicant: Hanon Systems, Daejeon (KR)

(72) Inventors: Stephan Werker, Merzenich-Golzheim (DE); Wilfried Pfahl, Elsdorf (DE); Mario Lenz, Kerpen (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 16/519,430

(22) Filed: Jul. 23, 2019

(65) Prior Publication Data

US 2019/0348225 A1   Nov. 14, 2019

Related U.S. Application Data

(62) Division of application No. 15/210,920, filed on Jul. 15, 2016, now Pat. No. 10,410,795.

(30) Foreign Application Priority Data

Jul. 16, 2015   (DE) .................. 10 2015 111 541

(51) Int. Cl.
*H01G 9/00* (2006.01)
*F04B 37/00* (2006.01)
*F04B 35/04* (2006.01)
*H01G 2/08* (2006.01)
*H01G 2/10* (2006.01)
(Continued)

(52) U.S. Cl.
CPC ............ *H01G 9/0003* (2013.01); *F04B 29/00* (2013.01); *F04B 35/04* (2013.01); *H01G 2/08* (2013.01); *H01G 2/106* (2013.01); *H01G 9/06* (2013.01); *F25B 31/00* (2013.01); *F25B 2400/077* (2013.01)

(58) Field of Classification Search
None
See application file for complete search history.

(56) References Cited

U.S. PATENT DOCUMENTS

2003/0047302 A1   3/2003   Hebel et al.
2007/0231165 A1   10/2007   Koide et al.
(Continued)

FOREIGN PATENT DOCUMENTS

CN   103748644 A    4/2014
DE    10301268 A1    7/2003
DE   102011006346 A1   11/2011
(Continued)

*Primary Examiner* — Reema Patel

(74) *Attorney, Agent, or Firm* — Shumaker, Loop & Kendrick, LLP; James D. Miller

(57) ABSTRACT

A system for mounting at least one cylindrical electrolytic capacitor on a heat sink, the heat sink having at least one bore for at least partially receiving a cylindrical electrolytic capacitor, and the bore partially or fully encompassing the cylindrical electrolytic capacitor once it has been received, wherein lateral surfaces of the cylindrical electrolytic capacitor are mechanically and thermally connected to surfaces forming the bore. The system providing thermal cooling of the electrolytic capacitor and enabling substantially uniform thermal cooling of the capacitor. A method for producing a connection between the at least one cylindrical electrolytic capacitor and the heat sink, and to a connection, obtainable by the method, between the at least one electrolytic capacitor and the heat sink.

5 Claims, 4 Drawing Sheets

Figure 1:
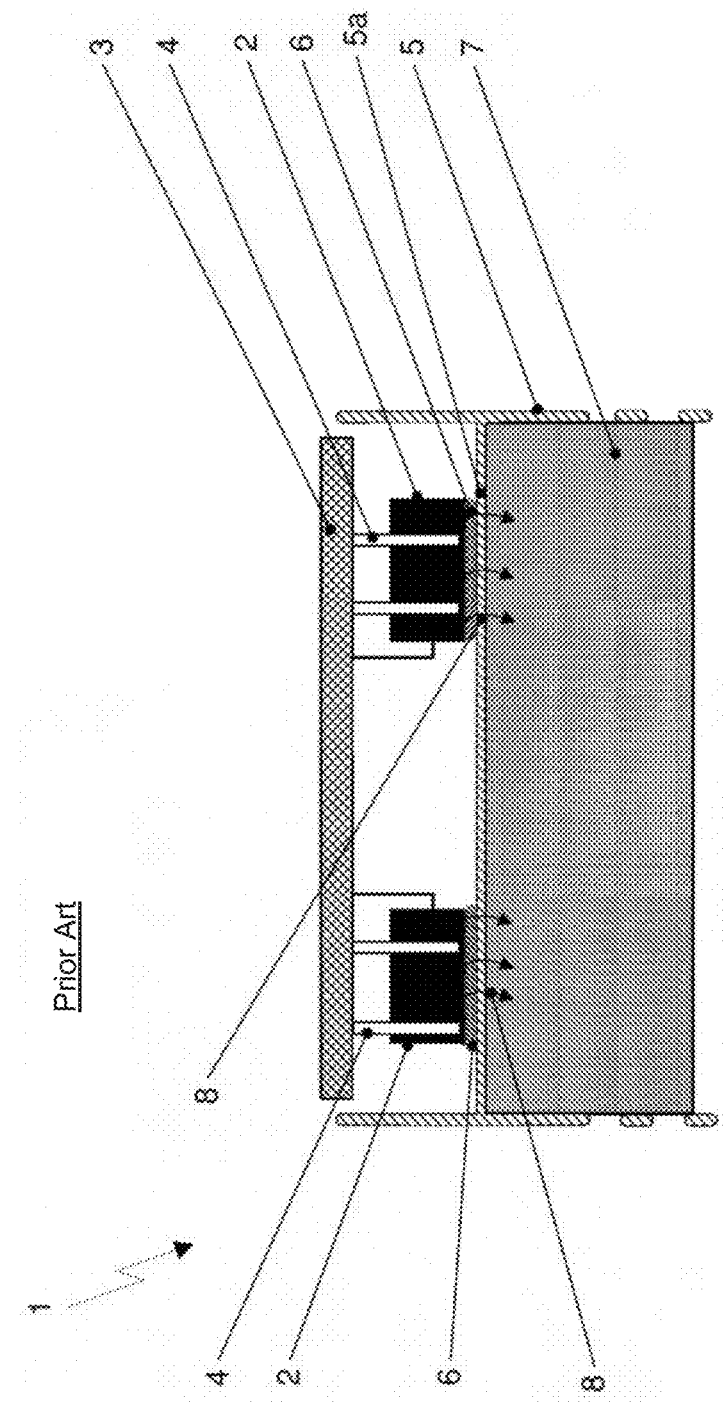

(51) Int. Cl.
*H01G 9/06* (2006.01)
*F25B 31/00* (2006.01)

(56) References Cited

U.S. PATENT DOCUMENTS

2013/0236753 A1    9/2013  Yue et al.
2014/0158340 A1    6/2014  Dixler et al.

FOREIGN PATENT DOCUMENTS

DE    102011081283 A1    2/2013
DE    102013109294 A1    3/2014

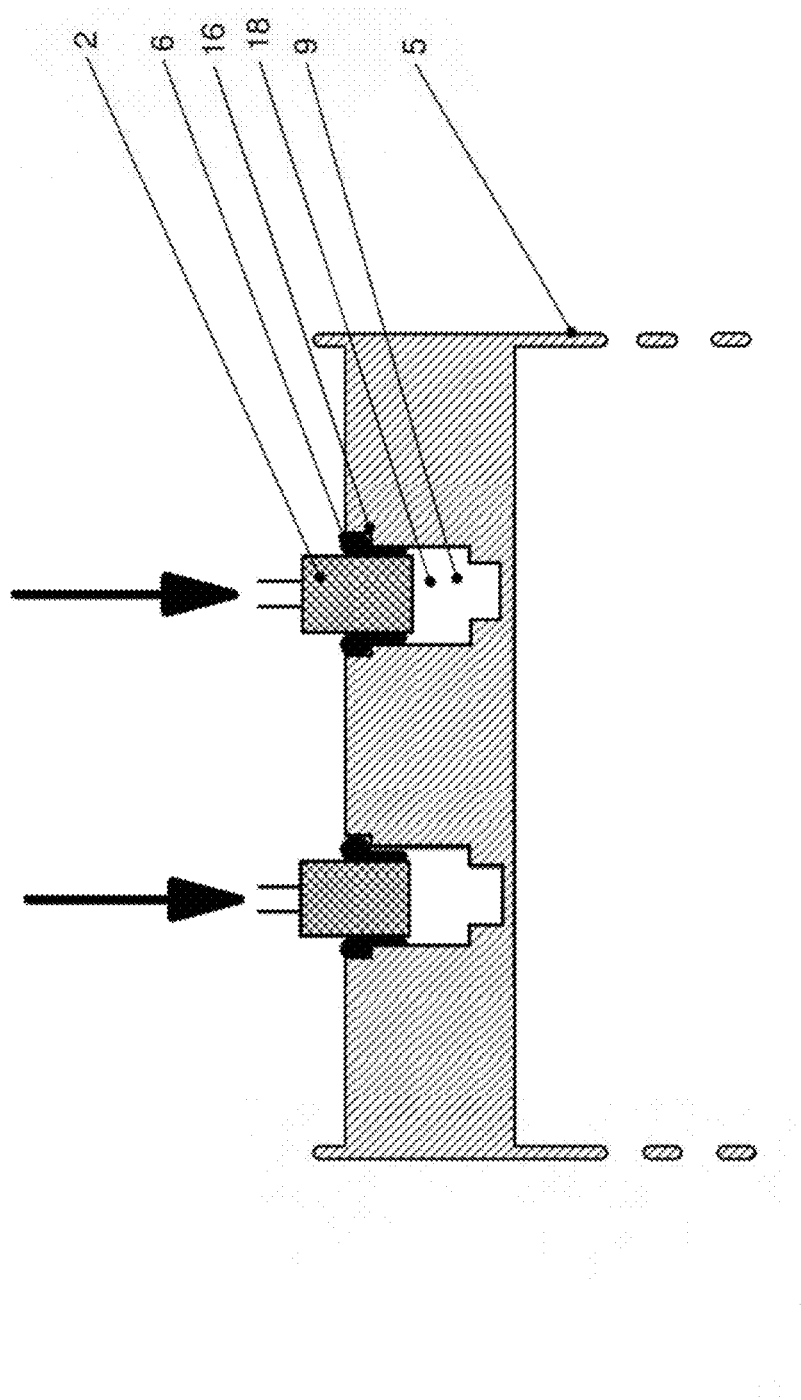

COOLING OF ELECTROLYTIC CAPACITORS IN ELECTRICAL CLIMATE COMPRESSORS

CROSS-REFERENCE TO RELATED PATENT APPLICATION

This patent application is a divisional patent application of U.S. patent application Ser. No. 15/210,920 which claims priority to German Patent Application No. DE 10 2015 111 541.7 filed Jul. 16, 2015, the entire disclosures of which are incorporated herein by reference.

FIELD

The invention relates to a system for mounting at least one cylindrical electrolytic capacitor on a heat sink, in particular on a housing of an electric refrigeration compressor of an air conditioning system. The invention further relates to a method for producing a connection between at least one electrolytic capacitor and a heat sink, involving the application of thermal adhesive to the electrolytic capacitors, particularly in electric refrigeration compressors. The invention further relates to a connection that is obtainable by such a method.

BACKGROUND

In power electronic devices, such as converters (inverters), energy must frequently be stored in intermediate circuit capacitors. This process is used for buffering and thereby filtering currents and disturbances caused by these currents through switching processes of a power electronic component, such as an inverter for driving an electric motor.

In the prior art, electrolytic capacitors are frequently used in assembling such intermediate circuit capacitors. Electrolytic capacitors have the advantage of high energy density, a wide operating temperature range and lower costs. Electrolytic capacitors are usually available in symmetrical cylindrical configurations and have either one terminal (+/−) on each end face (axial), or two terminals (+/−) on one end face (radial).

Due to the physical design of electrolytic capacitors, they possess parasitic resistance. Parasitic resistance can be described electrotechnically in terms of "ESR" (equivalent series resistance). The ESR of commercially available electrolytic capacitors is usually around a few ohms.

Switching processes in power electronic components result in a current loading of the intermediate circuit capacitors and thus an application of current against the ESR. This results in a dissipation power loss in the electrolytic capacitors, causing them to heat. The heating, in particular the heating of the electrolyte, leads to a deterioration of electrical properties, in particular the current-carrying capacity of the electrolytic capacitors. As a result, the filtering, interception and buffering of switching processes is deteriorated. This can lead to corresponding disturbances and interference in the power electronic component itself or in other components. The heating of the electrolytic capacitors or the electrolyte also leads to a shortening of the lifespan of the electrolytic capacitor. The risk is that the electrolyte may dry out or the dielectric strength of the electrolyte may be reduced. This leads to power electronic components needing to be serviced or replaced earlier and more frequently.

When inverters and thus intermediate circuit capacitors are used in conjunction with electric refrigeration compressors, it is therefore advisable to use the cooling power of the refrigeration compressors to actively cool these intermediate circuit capacitors, thereby diminishing the above-described negative effects of overheating.

One disadvantage of the cited prior art is that electrolytic capacitors are poorly and/or unevenly cooled. The uneven cooling may occur in each capacitor individually, that is to say, heat may be dissipated better in some parts of a capacitor than in other parts of the capacitor. Temperature differences may also exist among individual capacitors in an intermediate circuit filter.

A further known disadvantage of the prior art is that electrolytic capacitors that are mounted on an outer surface using retaining clamps are inadequately secured against vibrations.

For active cooling, the surface of the electrolytic capacitor must be attached with the lowest possible thermal resistance to the cooling surface or the heat sink. This can be achieved with either flexible thermopads or special thermally conductive adhesive. These cooling pads or thermal adhesives typically have thermal conductivities of 1 to 10 W/mK, and thus a lower thermal conductivity than a heat sink or the housing of the refrigeration compressor. Such housings/heat sinks are typically made of copper having a thermal conductivity of 400 W/mK or aluminum having a thermal conductivity of typically 235 W/mK.

It is further known to mount electrolytic capacitors with the lateral surface thereof lying flat or adhesively bonded in a sink. In the latter case, the adhesive is first applied using a metering unit, after which the capacitor is placed in the adhesive. It is further known to adhesively bond electronic components by encapsulation or potting.

A further disadvantage of the aforementioned prior art is that adhesive bonding on only a small part of the lateral surface of the capacitor results in uneven thermal attachment of the component. Moreover, the potting or encapsulation of electrical components requires that they be placed in relatively large cavities as compared with the size of the component. This results in a relatively long thermal pathway through the overmolded or potted material to the actual heat sink. In addition, with the overmolding/potting of multiple components, pathways of different lengths through the thermal material results in the disadvantage of thermally different heat dissipation in the components. Furthermore, the consumption of potting compound/overmolding compound is relatively high, which leads to increased costs.

SUMMARY

The object of the invention is to increase the electrical efficiency and the lifespan of electrolytic capacitors by means of an improved, uniform thermal attachment to an electric refrigeration compressor, particularly for use in vehicles. A further object of the invention is to improve robustness against vibrations by means of a fixed single installation of electrolytic capacitors. It is further the object of the invention to provide a method for applying thermally conductive adhesive to the lateral surfaces of an axial electronic component, more particularly to the lateral surfaces of electrolytic capacitors in electric refrigeration compressors.

The object is attained firstly by a system for mounting at least one cylindrical electrolytic capacitor on a heat sink, having the features shown and described herein.

According to the invention, the heat sink has at least one bore for at least partially receiving a cylindrical electrolytic capacitor. The bore partially or fully encompasses the cylindrical electrolytic capacitor once it has been received, with the lateral surfaces of the cylindrical electrolytic capacitor being mechanically and thermally connected to the surfaces of the bore, that is to say, the lateral surfaces and the surfaces of the bore are in thermal contact with one another. In other words, to improve the cooling of electrolytic capacitors, each of these is placed individually in a bore that fully or partially encompasses the lateral surface of the cylindrical capacitor and is preferably embodied as a blind hole. For the mechanical and thermal attachment of the capacitor to the surfaces of the bore or the blind hole, the lateral surfaces are preferably either glued using a highly thermally conductive adhesive or the capacitors are pressed into a bore with a corresponding fit. The thermal conductivity of the thermally conductive adhesive preferably ranges from 1 to 10 W/mK.

According to a particularly preferred embodiment of the invention, the heat sink is part of the housing of an electric refrigeration compressor of an air conditioning system, the housing of the electric refrigeration compressor preferably being made of copper or aluminum or an alloy of copper or aluminum. Alternatively, the heat sink may be made of steel.

It is further advantageous to provide a workpiece edge, preferably a stepped region, in the bore. This provides the capacitor with a depth stop during installation, while at the same time allowing the expansion valve of the electrolytic capacitor to expand into a cavity formed beneath the depth stop, in the event of a fault/safety hazard. This can be achieved, for example, in that a first section having a first diameter proceeds from an outer edge of the bore and terminates at a preferably stepped shoulder inside the bore, at the inner edge of which the first section having the first diameter merges into a second section having a smaller, second diameter inside the bore, giving the electrolytic capacitor a depth stop at the heel and a cavity therebeneath in the shape of the second section.

The advantages of the invention consist in an improved thermal cooling of electrolytic capacitors. This enables uniform thermal cooling both of the individual capacitors and throughout the entire intermediate circuit capacitor that comprises the individual capacitors. With the invention, a high current carrying capacity can be obtained even with high power losses in the capacitor as a result of a high current load. This also results in a lengthening of the lifespan of the capacitors. A further notable advantage is an improvement in the mechanical attachment to the heat sink, preferably to the housing of a refrigeration compressor. This results in improved vibration resistance.

The support for placement of the electrolytic capacitors can be provided by producing a suitable bore, preferably a suitable blind hole, in a solid material by means of mechanical machining, for example milling and/or drilling and/or reaming.

Alternatively, a corresponding support for the electrolytic capacitors may be provided by the shaping of a cast component or an extrusion molded component.

The object of the invention is attained secondly by a method for producing a connection between at least one cylindrical electrolytic capacitor and a heat sink as shown and described herein.

In this case, the heat sink has at least one bore for at least partially receiving the cylindrical electrolytic capacitor. The bore partially or fully encompasses the cylindrical electrolytic capacitor once it has been received, wherein a first section having a constant or variable diameter proceeds from an outer edge of the bore and terminates inside the bore at a workpiece edge where the first section merges, inside the bore, into a second section having a constant diameter which is smaller than the diameter of the first section at the workpiece edge. The method comprises the following steps:
a) a thermally conductive adhesive is applied in the first section such that the applied adhesive protrudes over the material edge into the interior of the bore, and
b) before the adhesive is cured, the electrolytic capacitor is inserted into the bore, at least part of the way into the second section, so that the as yet uncured adhesive is pulled along by the capacitor into the bore and the lateral surface of the electrolytic capacitor is wetted.

According to the concept of the invention, to improve the cooling of electrolytic capacitors, each of these is placed individually in a bore that fully or partially encompasses the lateral surface of the cylindrical capacitor. In the region of the outer edge of the bore, a first section is provided with a workpiece edge, preferably in the form of a stepped shoulder or a bevel. In the case of a stepped shoulder, the first section, which has a first constant diameter or a variable diameter, proceeds from the outer edge of the bore and terminates inside the bore at the stepped shoulder, which has an inner edge as the workpiece edge, where the first section merges inside the bore into the second section having the smaller diameter. Alternatively or additionally, the wall of the bore in the first section upstream of the workpiece edge may be embodied at least partially as a bevel, in which the diameter of the bore decreases constantly in the first section.

In the region of the first section, the thermally conductive adhesive is applied, for example to the stepped shoulder or the bevel by means of a metering device, preferably a metering tip. The amount of adhesive is metered such that the adhesive protrudes over the edge of the material, for example, over the inner edge of the shoulder, in other words into the bore diameter. When the electrolytic capacitor is then inserted into the corresponding bore, it will pull the as yet uncured adhesive along with it into the bore, or more precisely, into the second section. The lateral surface of the electrolytic capacitor is wetted, and is adhesively bonded with low thermal impedance.

According to a preferred embodiment of the invention, the heat sink or the cooling surface is part of the housing of an electric refrigeration compressor. The housing of the refrigeration compressor is preferably made of copper or aluminium, or an alloy of copper or aluminum. Particularly advantageous is a bore that is embodied as a blind hole in the heat sink.

Adhesives having a thermal conductivity of 1 to 10 W/mK are preferably used as the thermally conductive adhesive.

The invention further relates to a connection between at least one electrolytic capacitor and a heat sink, obtainable by the above-described method or the embodiments thereof. Particularly preferred is an embodiment in which the thermally conductive adhesive is electrically insulating.

The advantages of the invention consist in an improved, uniform thermal cooling of capacitors as a result of thin adhesive thicknesses and uniform adhesive bonding. Uniform thermal cooling of the individual capacitors and throughout the entire intermediate circuit capacitor is thereby achieved. In addition, the mechanical attachment to the heat sink or to the housing of the refrigeration compressor is also improved. As a result, vibration resistance is improved. Finally, the consumption of thermal adhesive is also decreased as compared with potting.

DRAWINGS

Figure 2:
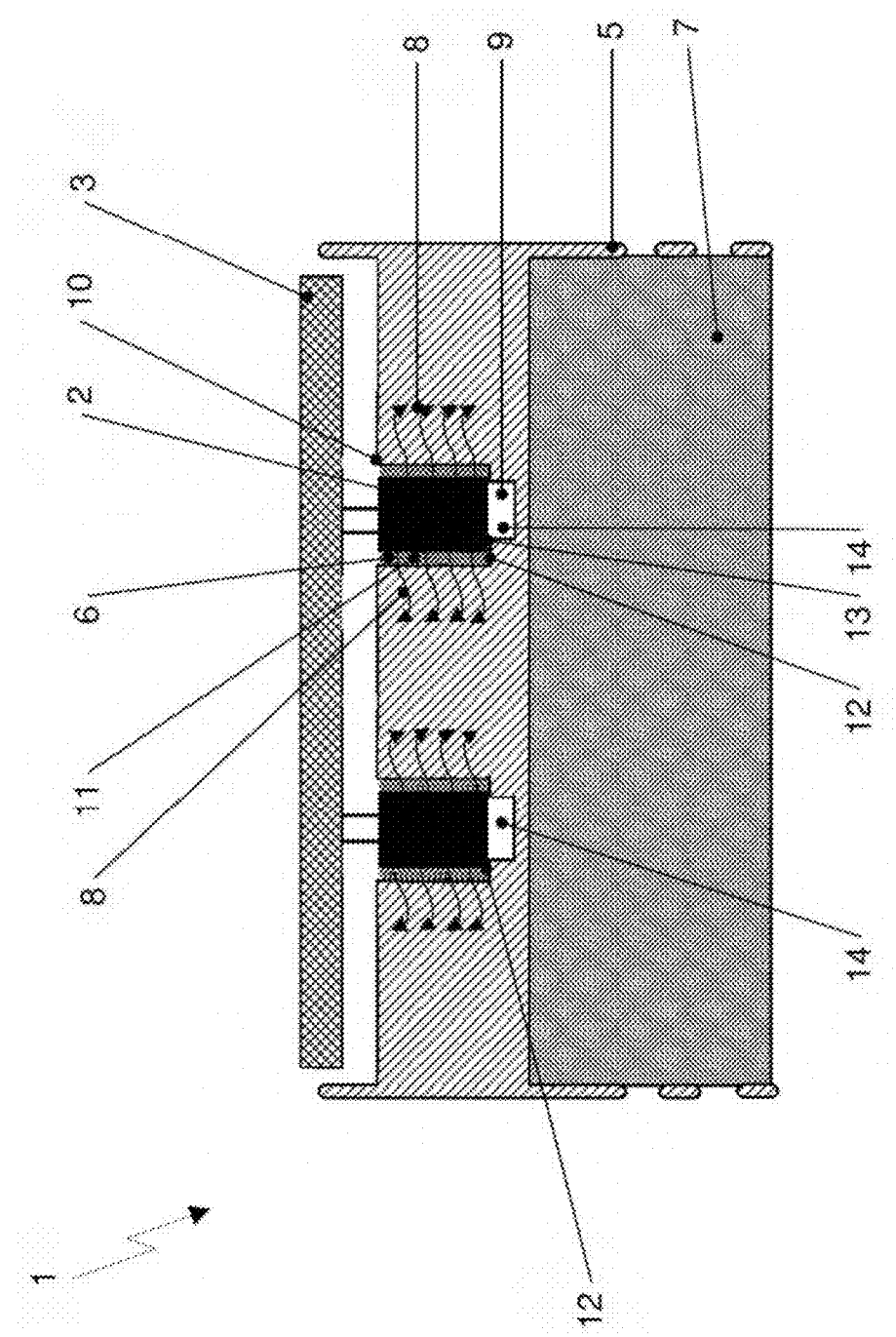
Figure 3:
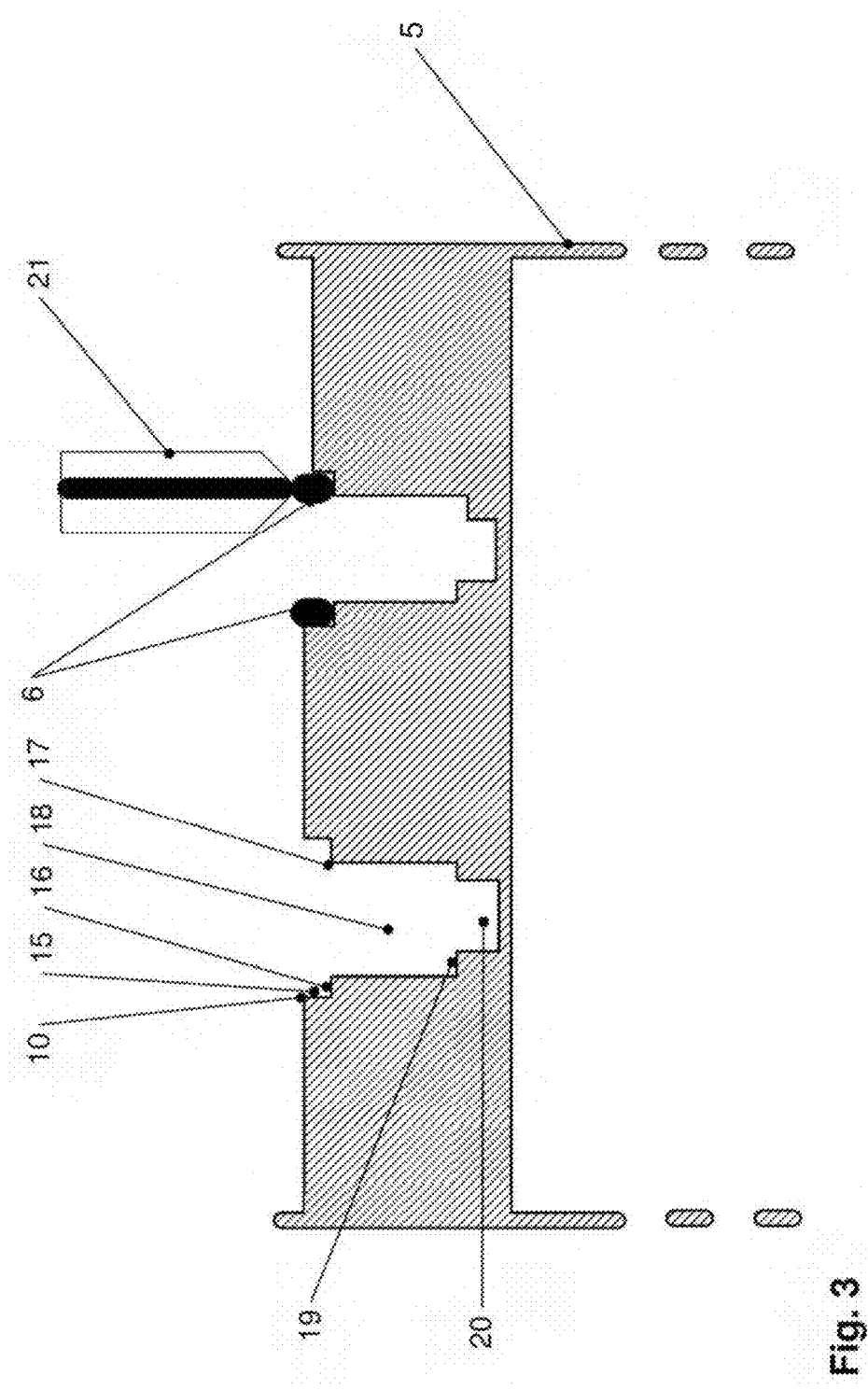

Additional details, features and advantages of embodiments of the invention are provided in the following description of embodiment examples, with reference to the accompanying set of drawings. The drawings show:

FIG. 1: a system for mounting electrolytic capacitors for cooling on an electric refrigeration compressor of the prior art, FIG. 2: a system for mounting electrolytic capacitors on an electric refrigeration compressor, FIG. 3: a schematic representation of the application of the adhesive in a shoulder of a blind-hole bore according to one embodiment example of the present invention, and FIG. 4: a schematic representation of the insertion of an electrical component and wetting of the lateral surface thereof with a thermally conductive adhesive.

DETAILED DESCRIPTION

FIG. 1 is a schematic illustration of a prior art assembly 1 for cooling electrolytic capacitors 2 or a system 1 for mounting electrolytic capacitors 2 for their cooling on an electric refrigeration compressor. In addition to electrolytic capacitors 2, assembly 1 also comprises a power electronics circuit board 3, to which the electrolytic capacitors 2 are mechanically connected via retaining clips 4. Electrolytic capacitors 2 are connected to a power electronics circuit board 3 both electrically and mechanically by means of retaining clips 4. For active cooling, the surface of electrolytic capacitor 2 must be attached to heat sink 5 or to cooling surface 5a with the lowest possible thermal resistance. From this prior art example, it is known that electrolytic capacitors 2 are potted or adhesively bonded individually, or a plurality of capacitors 2 are potted or adhesively bonded, using a plastic resin 6. This may be achieved by using either flexible thermopads 6 or special thermally conductive adhesive 6. The two electrolytic capacitors 2, as FIG. 1 shows, are seated in a trough-shaped receiving region, which is part of housing 5 of the refrigeration compressor. FIG. 1 shows the outcome of a known procedure for mounting electrolytic capacitors 2, in which cylindrical electrolytic capacitors 2 are mounted horizontally, with a small portion of their lateral surface in contact with cooling surface 5a of housing 5. In other words, electrolytic capacitors 2 are positioned with their lateral surface lying flat on a housing 5 of an electric refrigeration compressor as a heat sink 5, which is filled with a cooling medium 7, and are adhesively bonded thereto by means of plastic resin 6 as an adhesive 6. In this process, thermally conductive adhesive 6 is first applied by means of a metering unit not shown in FIG. 1, after which electrolytic capacitor 2 is placed in adhesive 6. It is further known to adhesively bond electronic components by overmolding or potting. FIG. 1 also schematically illustrates the cooling/heat dissipation of electrolytic capacitors 2, indicated by arrows 8 representing dissipated heat 8.

To improve the cooling of electrolytic capacitors, each of these is placed individually in a bore that fully or partially encompasses the lateral surface of the cylindrical capacitor. FIG. 2 schematically illustrates a system 1 for mounting two cylindrical electrolytic capacitors 2, which are electrically and mechanically connected to a power electronics circuit board 3, into two bores 9 embodied as blind holes 9. This system according to the invention offers improved cooling as compared with the prior art. Each of bores 9 is designed to at least partially accommodate one cylindrical electrolytic capacitor 2. Each bore 9 partially or fully encompasses the cylindrical electrolytic capacitor 2 once it has been received, with the lateral surfaces of the cylindrical electrolytic capacitor 2 being mechanically and thermally connected to the surfaces of bore 9. In system 1 of FIG. 2, this is accomplished by gluing or pressing the lateral surfaces of cylindrical electrolytic capacitor 2 into bore 9 using a thermally conductive adhesive 6. Heat 8 can thereby be transferred from capacitors 2 through adhesive 6 and the walls of the bore 9 to housing 5 of the electric refrigeration compressor.

A first section 11 having a first diameter extends starting from an outer edge 10 of bore 9, and terminating inside bore 9 at a stepped shoulder 12. This stepped shoulder 12 has an inner edge 13. At this inner edge 13, first section 11, which has the first diameter, merges inside bore 9 into a second section 14 having a smaller, second diameter. Thus, first section 11 having the first diameter serves as the area for receiving cylindrical electrolytic capacitor 2, whereas electrolytic capacitor 2 reaches a depth stop at shoulder 12. Furthermore, in the event of a fault/safety hazard, the expansion valve of the electrolytic capacitor 2 can expand into cavity 14, or second section 14, formed beneath the depth stop.

FIG. 3 and FIG. 4 schematically illustrate a method for producing a connection between at least one cylindrical electrolytic capacitor 2 and a cooling surface 5a, according to one embodiment of the present invention. This method involves the application of thermally conductive adhesive 6 to electrolytic capacitors 2 in an electric refrigeration compressor. Heat sink 5 in this case has two bores 9, each designed to at least partially accommodate one cylindrical electrolytic capacitor 2. According to the representations of FIG. 3 and FIG. 4, these bores 9 are designed as blind holes 9. Bore 9 partially or fully encompasses cylindrical electrolytic capacitor 2 once it has been received, and a first section 15 having a first diameter of bore 9 extends, starting from an outer edge 10 of bore 9, and terminating inside bore 9 at a stepped shoulder 16, at the inner edge 17 of which, as workpiece edge 17, first section 15 having the first diameter merges inside bore 9 into a second section 18 having a smaller, second diameter. In this embodiment example, second section 18 serves as a space for receiving electrolytic capacitor 2, with second section 18 terminating inside bore 9 at an additional stepped shoulder 19, which provides a depth stop for electrolytic capacitor 2. Beneath the depth stop, a third section 20 having a third diameter, a cavity 20, is formed. The expansion valve of the electrolytic capacitor 2 can expand into this cavity 20 in the event of a fault/safety hazard.

A shoulder 16 is thus provided in the region of outer edge 10 of bore 9. On this shoulder 16, thermally conductive adhesive 6 is applied by means of a metering tip 21 of a metering device, as shown in FIG. 3. First section 15 thus serves in this case as an application area for adhesive 6. A thermally conductive adhesive 6 is applied to shoulder 16 in such a way that the applied adhesive 6 protrudes beyond inner edge 17 of shoulder 16, which corresponds to the smaller, second diameter, into the interior of bore 9. When electrolytic capacitor 2, as shown schematically in FIG. 4, is then inserted at least partially into second section 18 in corresponding bore 9, this electrolytic capacitor 2 will pull the as yet uncured adhesive 6 along with it into bore 9. The lateral surface of electrolytic capacitor 2 is wetted, and is adhesively bonded with low thermal impedance.

LIST OF REFERENCE SIGNS 1 system, assembly for cooling electrolytic capacitors
2 electrolytic capacitors
3 power electronics circuit board
4 retaining clips 5 heat sink, housing of a refrigeration compressor, cooling surface
5a cooling surface
6 adhesive, plastic resin, thermopads, thermal adhesive, thermally conductive adhesive
7 cooling medium
8 heat, dissipated heat, heat transfer
9 bore, blind hole
10 outer edge of bore 9
11 first section (of bore 9) having a first diameter (as an area for receiving cylindrical electrolytic capacitor 2)
12 shoulder (for depth stop)
13 inner edge of shoulder
14 second section (of the bore) having a second diameter (below the area for receiving cylindrical electrolytic capacitor 2), cavity
15 first section (of bore 9) having a first diameter (as area of application for adhesive 6)
16 shoulder (for the application of adhesive 6)
17 inner edge, workpiece edge
18 second section
19 stepped shoulder (for depth stop)
20 third section, cavity
21 metering tip

What is claimed is:

1. A method for producing a connection between at least one cylindrical electrolytic capacitor and a heat sink, wherein the heat sink has at least one bore for at least partially receiving the at least one cylindrical electrolytic capacitor and the at least one bore partially or fully encompasses the at least one cylindrical electrolytic capacitor, and wherein a first section having a constant or variable diameter extends from an outer edge of the at least one bore and terminating inside the at least one bore at a workpiece edge, wherein the first section merges inside the at least one bore into a second section having a constant diameter smaller than the diameter of the first section, the method comprising the steps of:
   a) applying a thermally conductive adhesive in the first section, wherein the applied adhesive protrudes over the workpiece edge into an interior of the at least one bore, and
   b) inserting the at least one electrolytic capacitor at least partially into the second section of the at least one bore before the adhesive is cured, so a portion of the uncured adhesive is pushed into the at least one bore and a lateral surface of the at least one electrolytic capacitor is wetted by the uncured adhesive.

2. The method according to claim 1, wherein the thermal adhesive is applied by a metering tip of a metering unit.

3. The method according to claim 1, wherein the first section extends from the outer edge of the at least one bore and terminates inside the at least one bore at a stepped shoulder which includes the workpiece edge where the first section merges inside the at least one bore into a second section.

4. The method according to claim 1, wherein a wall forming the at least one bore in the first section is configured at least partially as a bevel, wherein the diameter of the first section decreases constantly.

5. The method according to claim 1, wherein the thermally conductive adhesive is electrically insulating.

* * * * *